Figure 4:
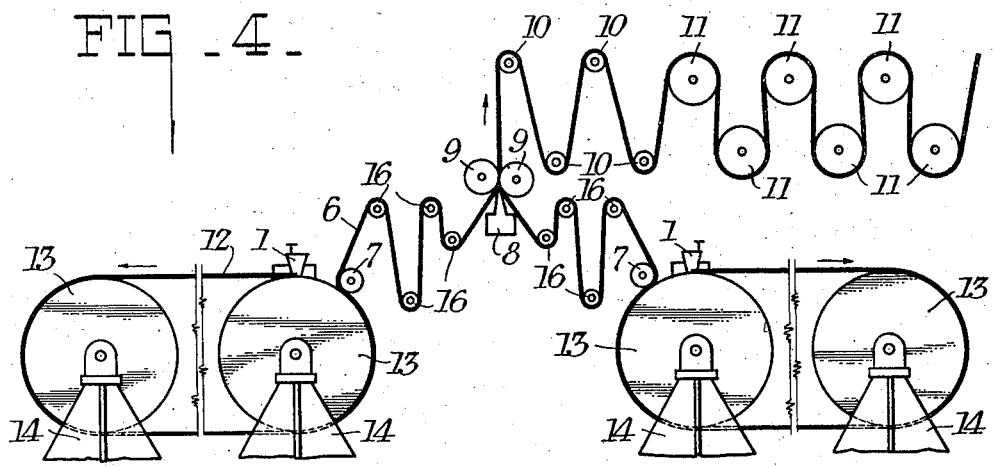

June 9, 1925.                                                 1,540,822
H. E. VAN DERHOEF
PROCESS OF MAKING LAMINATED FILMS
Filed June 27, 1924           3 Sheets-Sheet 1
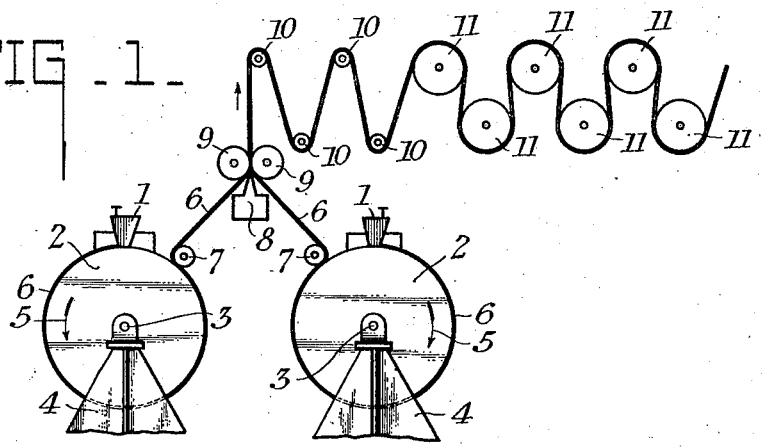
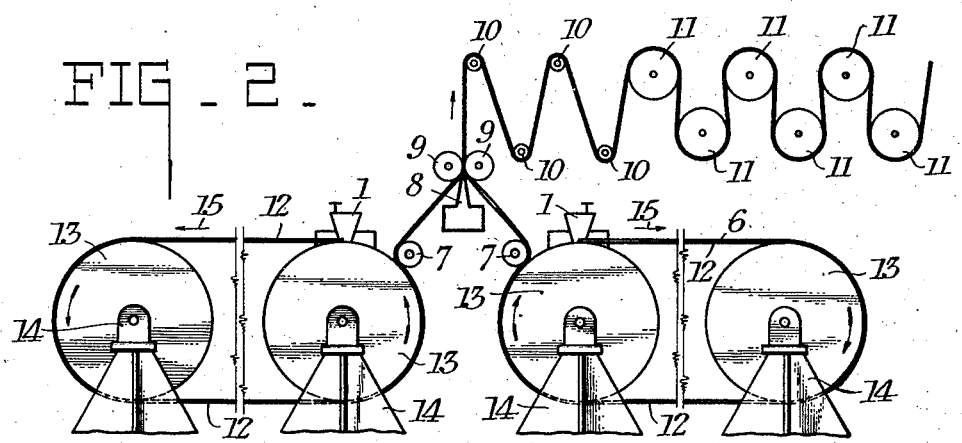
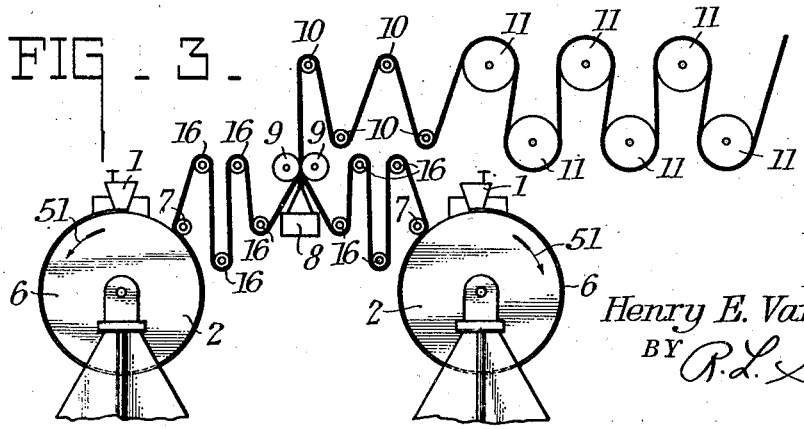
INVENTOR,
Henry E. VanDerhoef,
BY
ATTORNEY June 9, 1925.

H. E. VAN DERHOEF

PROCESS OF MAKING LAMINATED FILMS

Filed June 27, 1924  3 Sheets-Sheet 2

1,540,822

INVENTOR,
Henry E. Van Derhoef,
BY R. L. Stinchfield
ATTORNEY

June 9, 1925.
H. E. VAN DERHOEF
PROCESS OF MAKING LAMINATED FILMS
Filed June 27, 1924
1,540,822
3 Sheets-Sheet 3
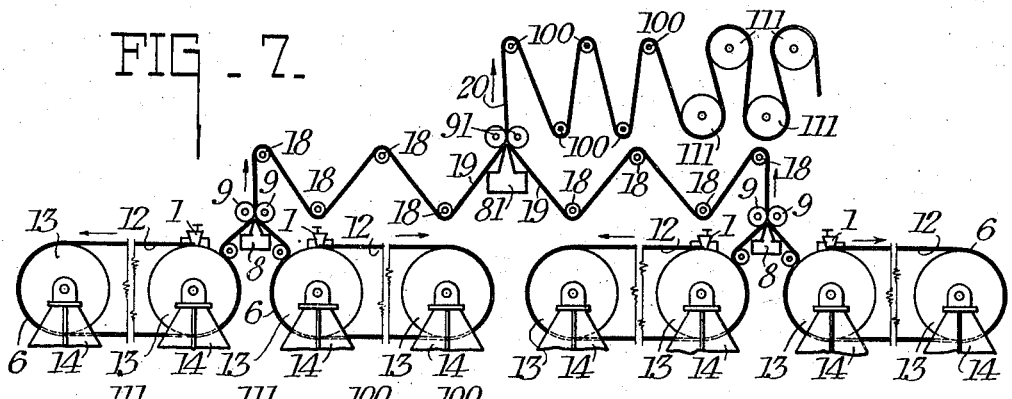
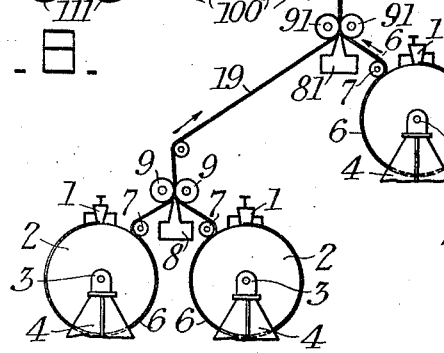
INVENTOR,
Henry E. Van Derhoef,
BY
ATTORNEY Patented June 9, 1925.

1,540,822

UNITED STATES PATENT OFFICE.

HENRY E. VAN DERHOEF, OF ROCHESTER, NEW YORK, ASSIGNOR TO EASTMAN KODAK COMPANY, OF ROCHESTER, NEW YORK, A CORPORATION OF NEW YORK.

PROCESS OF MAKING LAMINATED FILMS.

Application filed June 27, 1924. Serial No. 722,836.

*To all whom it may concern:*

Be it known that I, HENRY E. VAN DERHOEF, a citizen of the United States of America, residing at Rochester, in the county of Monroe and State of New York, have invented certain new and useful Improvements in Processes of Making Laminated Films, of which the following is a full, clear, and exact specification.

This invention relates to processes of making laminated films, the layers of which comprise cellulosic-addition-compounds. One object of the invention is to provide a rapid and sure process for uniting sheets of cellulosic addition compounds into laminated film. Another object is to provide a process in which the union of such sheets is effected while at least part of said sheets are in the most advantageous condition for this operation. Still another object of the invention is to provide an economical and simplified process in which the aggregate time of all drying operations is lessened and said operations are simplified. Other objects will hereinafter appear.

In the accompanying drawing, in which like reference characters denote like parts throughout,—

Fig. 1 is a diagrammatic side elevation illustrating the carrying out of my process in one arrangement of apparatus, the relative sizes of the parts being exaggerated and certain mechanical details being omitted, or parts being broken away, for the sake of clearness;

Figs. 2 to 10 inclusive are similar views showing other arrangements for carrying out variations of my process.

There have come into use laminated films, the layers of which comprise cellulosic-addition-compounds, such as nitrocellulose, acetyl cellulose (preferably the acetone-soluble variety) and cellulose ethers, like water-insoluble ethyl cellulose. While the layers may comprise a cellulosic-addition-compound alone or mixed with one or more of the other such compounds, nevertheless the layers customarily contain in addition modifying or colloidizing substances, as will be understood by those skilled in the art. While for convenience, I shall hereinafter refer to layers or sheets of cellulosic-addition-compounds, it will nevertheless be understood that these modifying or colloidizing materials may be present if desired.

These laminated sheets are used for many purposes, one of the most prominent being as supports for photographically sensitive layers or emulsions. For this purpose, they are substantially transparent, and one of the practical methods of manufacturing them is by cementing or welding, face to face a plurality of transparent sheets of cellulosic-addition-compound. It is important that the union be effected strongly throughout the contacting faces and without impairing their transparency. A suitable process and apparatus for effecting this result is disclosed in my application, Serial No. 673,841, filed Nov. 9, 1923 for process and apparatus for uniting strips of material.

In carrying out such a process, sheets of cellulosic-addition-compounds have been united after being "cured",—that is, after the volatile solvents or ingredients of the sheets have been sufficiently evaporated to leave them in the best condition for use in the arts, say for example in the photographic art, for the reception of gelatino-silver-halid emulsions.

I have found that marked advantages are obtained if at least one (and preferably all) of the sheets which are united to form such laminated film are in an only partially cured state when the face-to-face union of them is effected. They are in this state, for example, when they are stripped from the customary film-making machines. The film-forming compositions comprising flowable solutions of cellulosic-addition-compound are spread or deposited in such machines upon a sheet-forming surface. The volatile ingredients (usually volatile solvents) are allowed to evaporate from the layer thus formed until it becomes a solid or set sheet, face-dried and self-sustaining,—that is, the sheet is strong enough to be stripped from said surface without harmful stretching and the surfaces of it are sufficiently free from the softening effects of volatile solvents to enable them to pass without harm into contact with guide rollers and without sticking to the latter.

The sheets when in this condition contain a surplus of volatile liquid or solvent in the interior thereof. This is usually a very considerable amount and has hitherto been largely driven off or "cured" out by a subsequent drying operation before the sheets are joined at the laminating or cementing station. But I have found that there is a twofold advantage in uniting the sheets, while the surplus of volatile liquid remains in the interior of the partly cured or "green" sheets.

In the first place, the union is effected more readily and more surely or uniformly throughout the contacting faces. Such faces while in dried condition are resistant to adhesion. The cement, usually a plain volatile solvent, is used during the uniting operation to soften such surfaces and thus overcome their resistance to adhesion, the softened surfaces coalescing into a weld under pressure. Where the sheets are cured or dried throughout, the action of the adherence inducing liquid is slower and it is more difficult to make it uniform throughout their faces. But when there is a surplus of solvent in the body or interior of the sheet itself, the relatively thin dried face of the sheet is rapidly and uniformly modified throughout its area by said liquid, so that a rapid and uniform union is quickly obtained.

In the second place, the drying operations are simplified and the aggregate time of the process is shortened by uniting sheets when in said partly cured state. The time and expense of fully curing the separate sheets before they are united is eliminated and the final drying operation (which is advisable in any event for the removal of the volatile adherence-inducing liquid) will likewise remove the surplus solvent or liquid from the interiors of the sheets. In other words, there is one main curing or drying operation in place of three or more drying operations which have heretofore taken place after the sheets have been stripped from the sheet-making surfaces.

My process may be carried out in many different ways. Several of the better ones will now be described in detail by way of example. In Fig. 1 the solutions of the cellulosic addition compounds are deposited from hoppers 1 through slots on to the smooth polished metallic peripheries of wheels 2, the latter rotating in bearings 3 on supports 4. The wheels turn in the directions of the arrows 5, thus forming coatings 6 of the solution or dope. As the wheel rotates a current of drying air is blown over it by any of the usual means (not shown), so that the coatings or sheets 6 become set or surface dried and likewise become sufficiently self-sustaining to withstand the necessary forces applied to them in the subsequent operations of the process.

When the sheets thus produced have reached this stage but still contain a considerable surplus of volatile solvent in the interiors thereof, they are stripped from the wheels 2 passing over rolls 7. They are then conducted through a relatively short path to a laminating apparatus of suitable type, say for instance one like that described in my application Serial No. 673,841, hereinabove cited. This comprises broadly the mechanism 8 for interposing an adherence-inducing liquid between the sheets, the sheets then being pressed together in face-to-face contact progressively by rollers 9.

The laminated film when it leaves the rolls 9 contains not only the adherence-inducing material which is used for laminating (generally a volatile solvent) but also contains the surplus volatile liquids or solvents in the interiors of the united sheets. The laminated film is, therefore, ready for a main drying or curing operation. It may, for example, be conducted conveniently over rolls 10 in zigzag fashion for a preliminary air drying and then over relatively larger heating rolls 11 of the type conventionally used in drying single sheets. It has been found that the time of this drying operation need not greatly, if any, exceed the time customarily used in drying single films of comparable thickness or laminated films made from fully cured sheets.

It will thus be seen that the time ordinarily used to make a full precuring of the sheets before laminating them is wholly saved. In the laminating apparatus a smaller amount of adherence-inducing liquid is used, because of the presence of so much volatile solvent in the interiors of the sheets. Moreover, the sureness with which the faces of the sheets are uniformly united is facilitated.

It will be understood that the several wheels and rolls hereinabove described may be power driven so as to have the proper surface speeds, or several of the rolls may be simply idlers mounted on anti-friction bearings. The recovery of the vapors given off during the several operations follows established practice and needs no detailed description to those skilled in the art. It will be noted that in Fig. 1 the arrangement of parts is such that the two outer surfaces of the coatings or sheets 6 are attached together in the interior of the laminated film. On the other hand, the surfaces of the sheets which were formed in contact with the polished surfaces of the wheels 2 are located on the outside of the laminated film.

Fig. 2 shows another form of apparatus in which my process may be conveniently carried out. Instead of depositing dopes or solutions containing the cellulosic-addition-compounds from hoppers 1 on to the peripheries of wheels, they are deposited upon the surfaces of polished belts 12 mounted upon wheels 13 turning on standards 14, the movements of the belts being in the directions of arrows 15. The belts are long relative to the diameters of wheels 13, but in order to keep the parts within the limits of the drawing, the intermediate portions of the belts 12 are broken away and the wheels 13 shown nearer together.

The coatings or sheets 6 of cellulosic-addition-compound become sufficiently set on the belts 12, so that they pass in a face-dried and self-sustaining condition over stripping rolls 7. From these rolls the sheets, containing the surplus volatile solvent and the interiors thereof, pass to the laminating mechanism and rolls 8 and 9 and thence over the drying system comprising rolls 10 and 11, as hereinabove described. Just as in the preceding example, the time, trouble and expense of curing the sheets before laminating is avoided and uniformity of adhesion is readily assured.

Fig. 3 shows an arrangement similar to that in Fig. 1, except for small drying systems between the film-forming surfaces and the laminating mechanism. The dope from hopper 1 is spread upon the peripheries of wheels 2 which move in the direction of arrows 51, the partly cured film passing over stripping rollers 7 and over driven or idler rolls 16, 16, say in zigzag fashion, to the laminating mechanism and rolls 8 and 9. This arrangement does not fully cure or dry out the sheets before they are laminated, but permits of slightly strengthening the sheets by carrying the surface drying to a somewhat further extent than is done in the system shown in Figs. 1 and 2. Or the surface drying may be carried to the same extent as that obtained in Figs. 1 and 2, but the coatings or sheets 6 may be stripped from the wheels 2 when they are in a greener condition than in Figs. 1 and 2. The laminated film finally passes through a drying system which may, as before, include sets of rolls 10 and 11.

Fig. 4 shows an arrangement similar to Fig. 2, except that the stripped green sheets pass through zigzag paths between the film-forming surface and the laminating mechanism in the way just described with respect to Fig. 3 and rolls 16.

Figure 5:
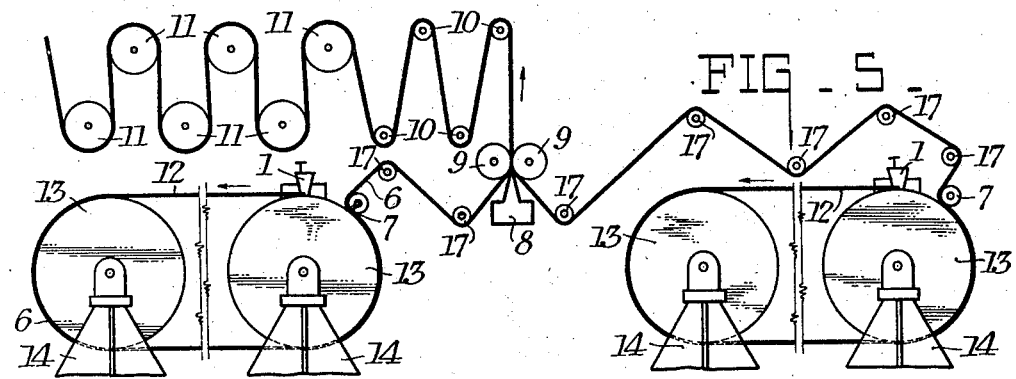
Figure 6:
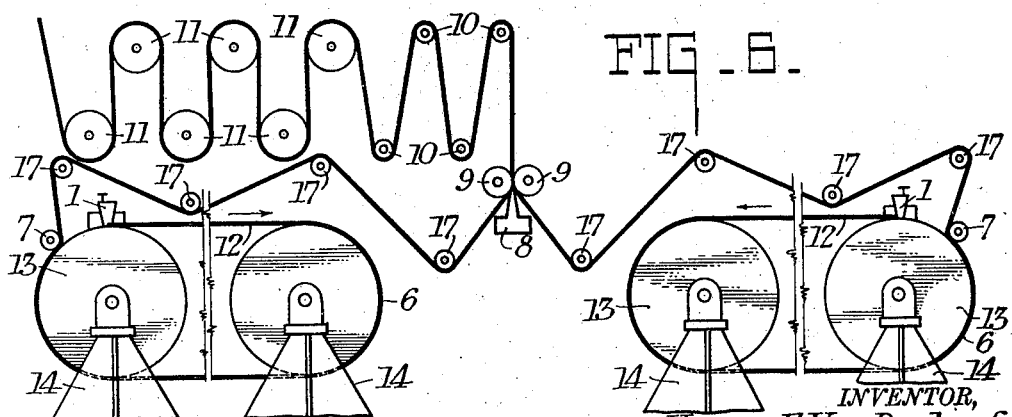

In all of the hereinabove described examples of my process those surfaces of the sheets which are outward with respect to the film-forming surfaces are united so as to be inward with respect to the finished film. This can be varied, however, as indicated in Figs. 5 and 6. In Fig. 5, for instance, one film-forming machine is reversed relative to the other as compared with their relative positions in Fig. 2. The green sheets, between stripping rollers 7 and the laminating mechanism and rollers 8 and 9, if necessary, may be supported by idler rolls 17. In this way the face of the sheet which is formed in contact with the right hand belt 12 is united with the face of the sheet which is out of contact with the left hand belt 12.

In Fig. 6 the film-forming machines are both reversed with respect to their positions in Fig. 2. The green sheets after passing over the stripping rollers 7 are then led, say by idler rolls 17, to the laminating mechanism and rolls 8 and 9. In this way the faces of the sheets which were formed in contact with the belts 12 are united in the laminating apparatus, and the outermost faces of the finished laminated film are the outermost of the sheets with respect to the belts 12.

The principles of my process are readily applicable to the production of laminated films containing a large number of sheets. Fig. 7 shows one way of uniting four sheets into a single film. Two units of the type shown in Fig. 2 are placed adjacent each other, say end to end, and the sheets thus formed on the belts 12 are laminated into two-layer films by the mechanism and rolls 8 and 9. These double films 19 are then drawn or guided by rolls 18 to the laminating mechanism 81 and rolls 91 which interpose adherence-inducing liquid and press them together into a thick four-ply film 20. This passes through any suitable drying mechanism, here illustrated as rolls 100 and 111, the latter being heated.

An odd number of sheets may be united, as well as an even number. Thus in Fig. 8 a part of wheels 2 are arranged with laminating mechanism and rolls 8 and 9 to form a two-layer film 19 in the way described with respect to Fig. 1. This film 19 is then laminated with the single sheet 6 from the right hand wheel in Fig. 8 by means of laminating mechanism and rolls 81, 91. The three-ply laminated film is then dried by means of the system which includes rolls 100 and 111.

While I prefer to unite sheets, all of which are in a green state, nevertheless the advantages of my process are attained to a useful extent when at least one of the sheets is merely surface dried and contains a surplus of volatile solvent in the interior of it. For example, in Fig. 9 the dope from hopper 1 is spread upon wheel 2 turning in bearing 3 on support 4. The coating or sheet 6 is stripped over roll 7, while still green, and is united by laminating mechanism and rolls 8 and 9 to a fully cured sheet 21 coming from roll 22 over a suitable guide 23. The laminated film is then dried, as by a system including rolls 10 and 11, to remove the surplus of solvent from one of the layers and the volatile adherence-inducing liquid. As hereinabove stated with respect to Fig. 1, the rolls in all of the figures may be power driven in accordance with the established practice in the film-making art. The handling of the vapors of the liquids and their subsequent recovery likewise follow established custom.

In Fig. 10 there is illustrated another arrangement in which a green sheet is united to fully cured sheets. The dope from hopper 1, is spread upon wheel 2, turning in bearing 3 on support 4. The sheet 6 is stripped, while merely surface dried and while it contains a surplus of volatile solvent, over roll 7, and is united by laminating mechanism and rolls 8 and 9 with cured sheet 21 from roll 22. The resulting two-ply film 24 is then united with another cured sheet 211 from roll 222 by laminating mechanism and rolls 82, 92. The side of film 24, corresponding to sheet 6, is still green when united to sheet 211. The film is then dried by a suitable system including rolls 10 and 11, to remove surplus volatile solvent and adherence-inducing liquid from the interior or middle layer.

My process is adaptable for use with any flowable sheet-forming dope or solution of cellulosic-addition-compound or compounds. While I shall refer to examples of typical dopes which are useful in my process, it will be understood that my process is in no way restricted to the use of any of these illustrative compositions. I may employ, for example, sheet-forming dopes in U. S. Patents, No. 1,379,596, P. C. Seel, May 24, 1921, cellulose nitrate composition; 1,342,601, P. C. Seel, June 8, 1920, cellulose ester composition and method of making the same; 1,217,027, L. Lilienfeld, Feb. 20, 1917, film and process of producing same; 1,281,080, P. C. Seel, Oct. 8, 1918, plastic composition and method of making the same; 1,354,726, S. J. Carroll, Oct. 5, 1920, mixed cellulose ester composition and process of making the same.

My process is likewise restricted to no particular adherence-inducing liquid, and the following illustrations are not limiting. In general in the preferred form of my invention, I employ a volatile solvent of the cellulosic-addition-compound of the sheets to be united. Thus, for instance, acetone is useful when uniting sheets containing cellulose nitrate or cellulose acetate or both, or when uniting a sheet of cellulose nitrate to a sheet of cellulose acetate. For uniting a sheet of cellulose ether, such as water-insoluble ethyl cellulose, to a sheet of cellulose nitrate, I may employ the combination of solvents described in U. S. Patent No. 1,437,828, A. F. Sulzer, Dec. 5, 1922, composition of matter for use in film making. For uniting a sheet of such cellulose ether to a sheet of cellulose acetate, I may employ, for example, the combination of solvents set forth in U. S. Patent No. 1,437,829, A. F. Sulzer, Dec. 5, 1922, composition for making anti-static photographic films. For uniting sheets of such cellulose ethers to other sheets of such ethers, I may employ, by way of illustration the combination of solvents disclosed in U. S. Patent No. 1,394,505, J. Donohue, Oct. 18, 1921, cellulose ether solvent and composition. While I prefer to use the combinations of solvents given in these patents without the presence of any cellulosic-addition-compound therein, nevertheless a small amount of such compound in the solvent is permissible.

Having thus described my invention, what I claim as new and desire to secure by Letters Patent is:

1. The process of making laminated films by uniting sheets of cellulosic-addition-compounds face to face, which comprises interposing adherence-inducing material between faces thereof and pressing said faces together, at least one of the sheets containing a surplus of a volatile liquid in the interior thereof but having its faces dried to resist adhesion, said material acting in the presence of said surplus to overcome said resistance to adhesion.

2. The process of making laminated films by uniting sheets of cellulosic-addition-compounds face to face, said sheets having a surplus of volatile solvent in the interiors thereof but having their faces dried to resist adhesion, which comprises interposing adherence-promoting solvent between faces of said sheets, while in said condition, to overcome said resistance, and pressing said faces together.

3. The process of making laminated films by uniting sheets of cellulosic-addition-compounds face to face, said sheets having a surplus of volatile solvent therein but having their faces dried to resist adhesion, which comprises interposing volatile solvent between faces of said sheets while in said condition to overcome said resistance, pressing said faces together, and drying out volatile solvent from the laminated film thus produced until said film is cured.

4. The process of making laminated films by uniting sheets of cellulosic-addition-compounds face to face, which comprises forming at least one of said sheets by spreading a solution of cellulosic-addition-compound in a solvent, which includes a volatile liquid, upon a sheet-forming surface, partially evaporating said liquid until the sheet thus formed is face-dried and self-sustaining but contains a surplus of said liquid therein, and stripping it from said surface, and uniting the sheet thus formed, while in said condition, with another sheet of cellulosic-addition-compound by interposing between said sheets an adherence-inducing material, which includes a volatile liquid, pressing said sheets together and evaporating said liquids from the laminated film thus formed.

5. The process of making laminated films by uniting sheets of cellulosic-addition-compounds face to face, which comprises spreading solutions of cellulosic-addition-compound, containing a volatile solvent, upon sheet-forming surfaces, partially evaporating said solvent until the sheets thus formed are face-dried and self-sustaining but contain a surplus of said solvent, stripping said sheets from said surfaces, introducing adherence-inducing volatile solvent between faces of said sheets while in said condition, pressing said sheets together and drying out volatile solvent from the laminated film thus formed until said film is cured.

Signed at Rochester, New York, this 19th day of June, 1924.

HENRY E. VAN DERHOEF.